United States Patent
Dunlop et al.

(10) Patent No.: US 6,554,546 B2
(45) Date of Patent: Apr. 29, 2003

(54) APPARATUS AND METHOD FOR MOVING AND PLACING GRANULATE

(75) Inventors: Richard Dunlop, Mission Viejo; Robert Griffin, Temecula, both of CA (US)

(73) Assignee: Air Pumped Sand & Gravel, Mission Viejo, CA (US)

( * ) Notice: Subject to any disclaimer, the term of this patent is extended or adjusted under 35 U.S.C. 154(b) by 0 days.

(21) Appl. No.: 09/994,579

(22) Filed: Nov. 26, 2001

(65) Prior Publication Data

US 2002/0094243 A1 Jul. 18, 2002

Related U.S. Application Data

(63) Continuation of application No. 09/408,766, filed on Sep. 29, 1999, now Pat. No. 6,336,774.

(51) Int. Cl.$^7$ .............................. B65G 53/00
(52) U.S. Cl. ...................................... 406/197
(58) Field of Search .................. 406/197, 198

(56) References Cited

U.S. PATENT DOCUMENTS

| | | | | |
|---|---|---|---|---|
| 3,608,593 A | * | 9/1971 | McCormick et al. | 141/11 |
| 6,079,461 A | * | 6/2000 | Fisher et al. | 141/1 |

* cited by examiner

*Primary Examiner*—Christopher P. Ellis
*Assistant Examiner*—Joe Dillon, Jr.
(74) *Attorney, Agent, or Firm*—Randall L. Reed; Levin & Hawes LLP

(57) ABSTRACT

An Improved Apparatus and Method for Moving and Placing Granulate is disclosed. The disclosed device is a portable, self-contained apparatus capable of discharging granulate into hard-to-reach areas, as well as providing assistance in covering vast open areas with granulate in a short time. Furthermore, the device and method described herein permit the application of granulate into areas that are normally inaccessible and would require many hours of human labor, and thereby potentially avoiding damage to the site that might be incurred if employing a prior method and device. Still further, the present invention serves to provide discharge of granulate near or adjacent to retaining walls and underneath concrete flatwork

3 Claims, 7 Drawing Sheets

APPARATUS AND METHOD FOR MOVING AND PLACING GRANULATE

This application is a continuation of Ser. No. 09/408,766 filed Sep. 29, 1999 now U.S. Pat. No. 6,336,774.

BACKGROUND OF THE INVENTION

1. Field of the Invention

This invention relates generally to the placement of granular materials and more specifically, to an Improved Apparatus and Method for Moving and Placing Granulate.

2. Description of Related Art

Sand, gravel and rock are used in a variety of applications for the construction industry. From aggregate base for concrete slabs, to back fill for retaining walls, granular materials, or granulates, are probably the most widely used substance, outside of concrete, in the construction industry. What has been a common problem has been moving the granulate from place to place when a dump truck and/or cranes and mechanical shovels do not have easy access. Over time, many attempts have been made at solving this problem. FIG. 1 depicts one attempt. FIG. 1 depicts a prior art method for constructing and maintaining a golf course. FIG. 1 shows how a patented method known as "Golf-Course Construction and Maintenance Methods," of the Guettler, et al, U.S. Pat. No. 5,147,156. The Guettler method involves the movement of sand or gravel from place to place on a golf course. In the example shown, sand in a sand pile 10 is transferred to a conveyor 12, which transports the sand into a pneumatic pumping device 14. The pneumatic pumping device 14 receives pneumatic air through a supply hose 16 from a compressor 18 that presumably is trailered to the appropriate location. The Guettler method includes pressurizing the sand in the pneumatic pumping device 14, discharging it through the hose 20, and out the discharge nozzle 22. In this manner, the sand pile 10, or other sand deposit, can be moved from place to place, such as into a new sand trap, very quickly and easily and without the need of wheelbarrows or dump trucks running back and forth across the golf course.

Although the Guettler system is very effective for a golf course, it is not suitable for a wide variety of construction applications in a traditional construction environment. Since the Guettler method does not include the use of a single unitary vehicle, it is necessary to drag the compressor 18 and the pneumatic pumping device 14 by truck or other tow device to the location for its use. As such, there is a potential for damage or loss of components and further the simple additional difficulties involved with the on-site erection and dismantling of the various components to be used. Furthermore, there is no indication that the Guettler unit permits the regulation of pressure. As it will be discussed later in the present disclosure, there are several applications where high discharge pressure of the granulate will prohibit the apparatus's use in certain applications. What is needed therefore, is a unitary vehicle that can be driven over the road, that can further move sand, gravel or rock, or other granulate, and that further permits the regulation of inlet air pressure to very low levels for specific applications.

Another application, namely the construction of concrete flatwork (slabs on grade and the like) typically require a 2- to 6-inch layer of sand, gravel or other granular material underneath a concrete slab. In these applications, a vapor barrier is often required in order to provide moisture protection. The material of choice for vapor barriers is typically of a size and material that is job-site-specific, and therefore delivered directly from the vendor to a location adjacent to the flatwork in progress. Since the vapor barrier and subsequent granulate installation are the final steps preceding the actual concrete pouring, they are not completed until all other mechanical, electrical lines and footing reinforcement bars have been installed. As such, heavy equipment cannot be driven over the pad (and lines and bars) because the lines and bars (and vapor barrier) would be disturbed. Because of this restriction, the granulate has heretofore been applied manually with wheelbarrows and shovels.

Furthermore, the process of concrete flatwork usually involves the installation of a perimeter forms for the slab (i.e. within which the concrete would be poured). These perimeter forms also interfere with the use of heavy equipment to load the granulate into the pad. What is needed is a device and method that permits the transfer of granulate into a concrete flatwork pad without disturbing the mechanical and electrical lines, the reinforcing bars, the vapor barrier or the perimeter forms.

FIG. 2 describes another attempt at solving the problem described above. FIG. 2 is another prior art method of moving and placing granular materials. FIG. 2 is a depiction of the Lightle "Method of Moving and Placing Granular Materials." U.S. Pat. No. 5,795,108. The Lightle method involves a truck 24, upon which is mounted a bed 26, within which granular material 28 is placed. The system also includes a separate air compressor 25 for supplying compressed air through the hose 27 to the truck 24. In operation, the granular material 28 exits the back of the bed 26, via the conveyor 30, where it will drop into the hopper 32. The hopper 32 then feeds a first pumping device 34 and a second pumping device 36, which are supplied by compressed air or other fluid, similar to the Guettler system. Granulate exiting the first pumping device 34 does so via the first hose 38 and then exits via the first nozzle 40. A further aspect of the Lightle method includes adding water at the first water inlet 42 just as the granulate is leaving the first nozzle 40. Similarly, granulate being pumped from the second pumping device 36 does so via the second hose 44 and second nozzle 46 whereat water is added at the second water inlet 48.

One problem with the Lightle unit is that once the truck bed 26 is devoid of granular material 28 (i.e. it's empty), the truck 24 must depart the site to get refilled at some industrial location (that has the capability of filling a dump truck-sized bed). Since the hopper 32 is configured only to receive granulate from the truck bed 26, there is no other way for feeding the first and second pumping devices, 34 and 36 respectively. Also, the Lightle device does not include an on-board compressed air source (i.e. mounted to the vehicle itself). What is still needed, therefore, is a fully self-contained unitary vehicle that works for sand, gravel and equivalent granulates, that does not need to leave the site at any time to replenish the granulate.

SUMMARY OF THE INVENTION

In light of the aforementioned problems associated with the prior devices and methods, it is an object of the present invention to provide an Improved Apparatus and Method for Moving and Placing Granulate. It is an object that the present invention provide a portable, self-contained apparatus capable of discharging granulate into hard-to-reach areas, as well as providing assistance in covering vast open areas with granulate in a short time. It is a further object that the device and method permit the application of granulate into areas that are normally inaccessible and would require many hours of human labor, and thereby potentially avoiding damage to the site that might be incurred if employing a prior method and device. It is a still further object that the present invention serve to provide discharge of granulate near or adjacent to retaining walls and underneath concrete flatwork.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide an Improved Apparatus and Method for Moving and Placing Granulate.

Figure 1:
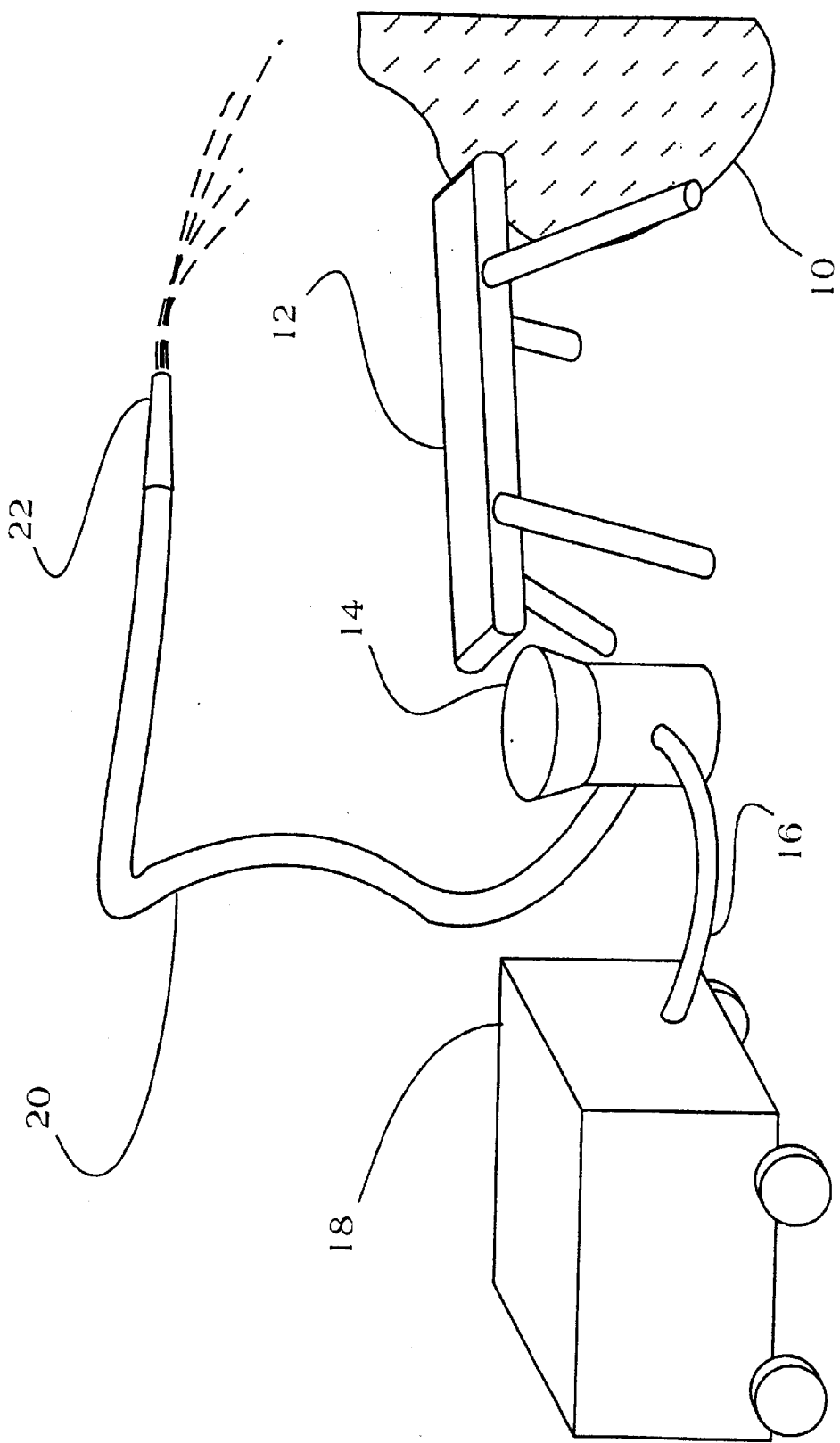
FIG. 1 depicts a prior art method for constructing and maintaining a golf course.
Figure 2:
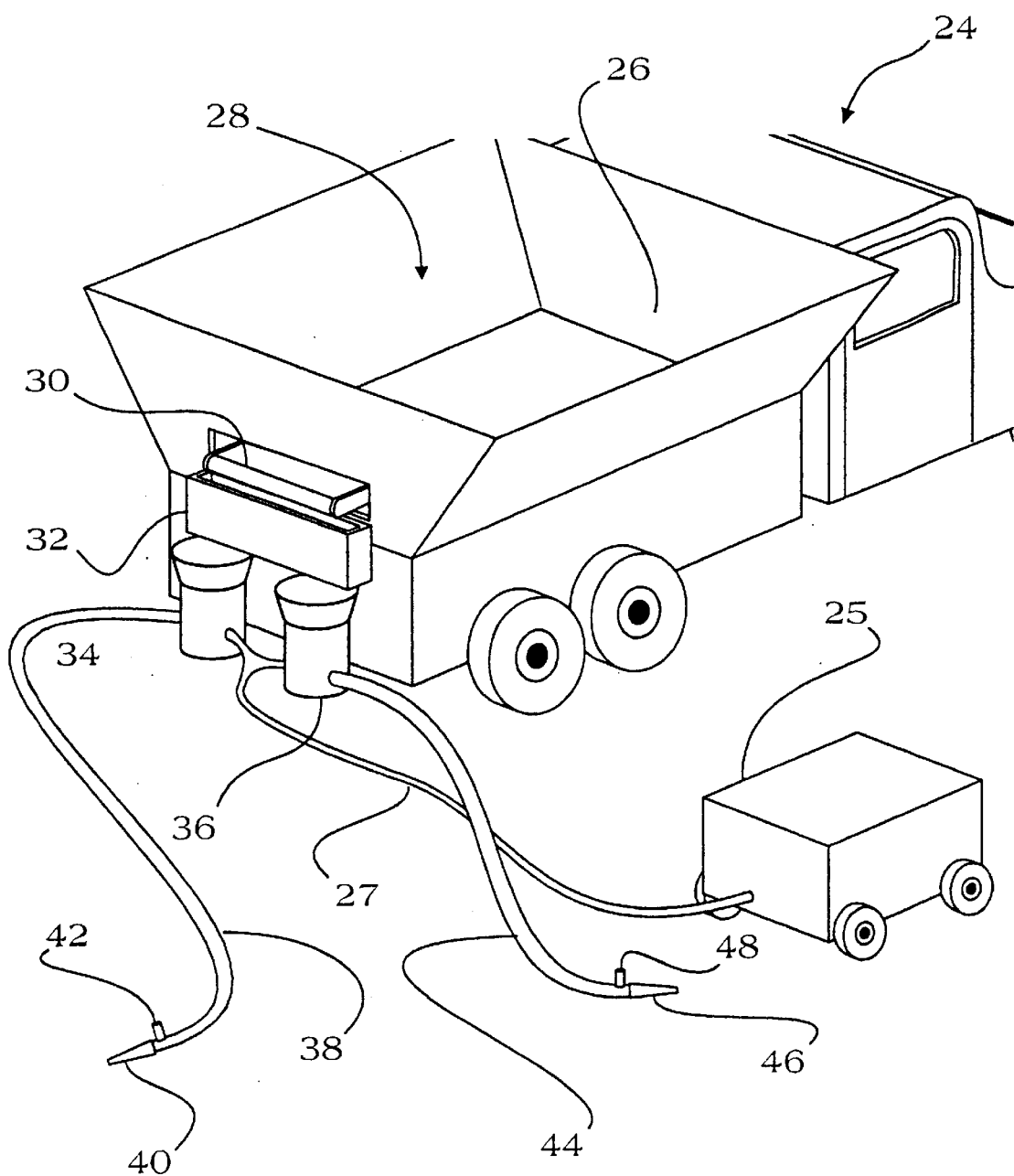
FIG. 2 is another prior art method of moving and placing granular materials.
Figure 3:
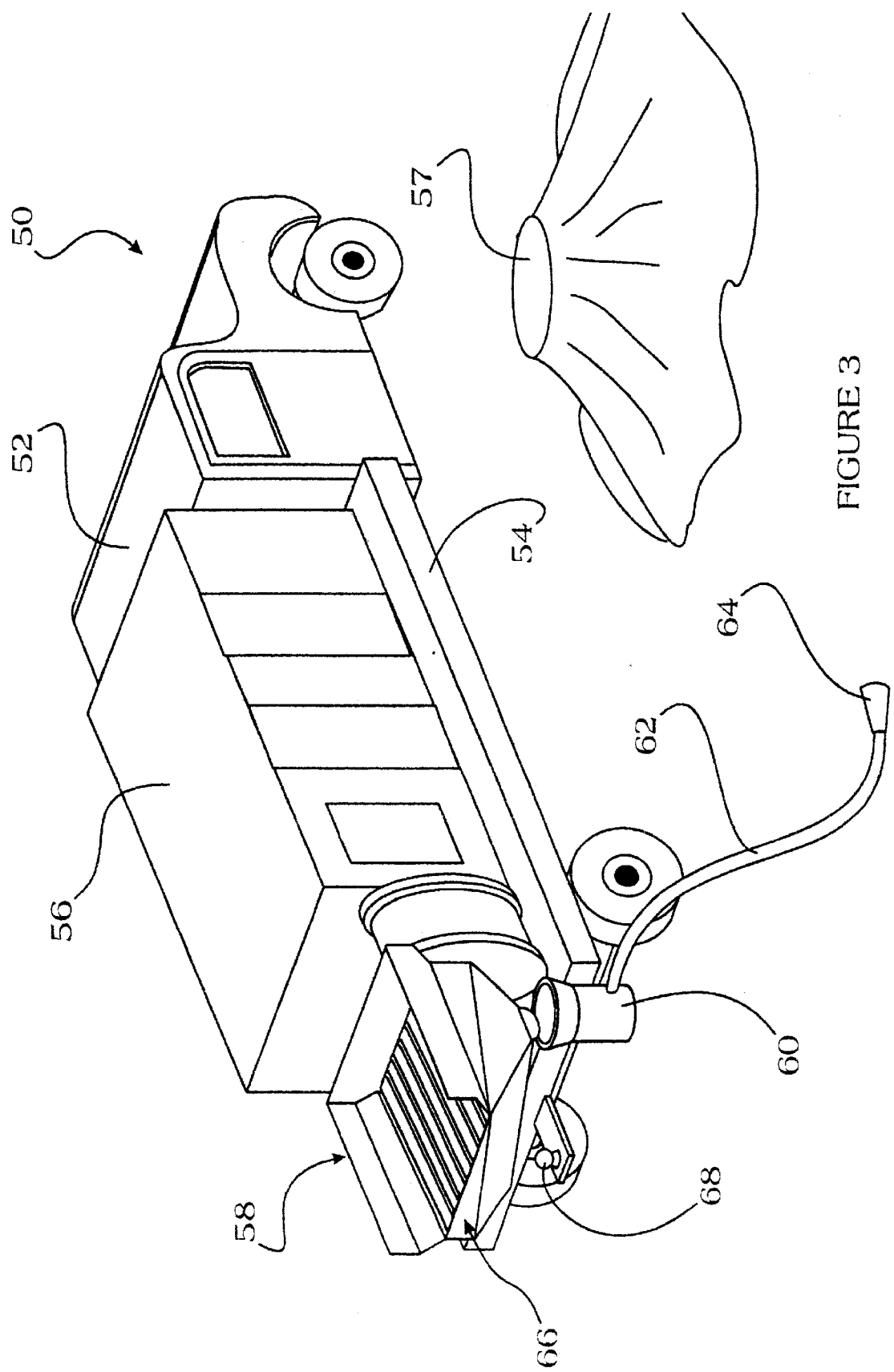
FIG. 3 is a perspective view of a preferred self-propelled granulate application apparatus of the present invention.

The present invention can best be understood by initial consideration of FIG. 3. FIG. 3 is a perspective view of a preferred self-propelled granulate application apparatus 50 of the present invention. As can be seen, the apparatus 50 comprises a fully functional truck 52 having a substantially flat bed 54 upon which is mounted a high capacity air compressor 56. What is unique, is the fact that rather than mounting a receptacle for granulate on the bed 54, all that is mounted there is the air compressor 56, the feeder/hopper means 58, the pumping device 60 and the hose 62. The feeder/hopper means 58 is configured to receive loads of granulate and then feed the granulate in a consistent manner into the attached pumping device 60 for pneumatic compression into the hose 62. The hose 62 is stored on a hydraulic or air driven reel which dispenses the hose 62 for quick set-up and retracts it for ease of returning to storage on the truck 52. Again, what is unique here is that the mouth 66 of the feeder/hopper means 58 is configured to receive loads from a loader tractor or other piece of loading equipment, such that the feeder/hopper means 58 can be supplied with a continuous flow of granulate, essentially until the truck 52 runs out of fuel, which in effect is an indefinite time, since the truck 52 will have enough fuel to run all day, and at least through one shift of human laborers, if not more. It is a simple matter of providing a continuous flow of granulate to the feeder/hopper means 58 via the mouth 66, such as by a loader tractor, while another technician administers the hose 62 and nozzle 64 to apply the granulate in the desired location. Furthermore, the apparatus 50 includes a tow hitch 68 at its rear end for hitching the aforementioned loader tractor thereto so that the apparatus 50 can be driven on the road virtually anywhere with the loader tractor in tow (on a trailer). Once arriving at the site, the loader tractor (on its trailer) is off-loaded from the unitary vehicle 50 and the trailer (not shown) is disconnected therefrom as well. Subsequently, the loader tractor moves granulate (including rock, sand, gravel or other material) from the granulate stockpile 57 and into the mouth 66 of the feeder/hopper means 58.

It should further be appreciated that the single hose model shown here is simply one embodiment; in other embodiments, the vehicle 50 will include an optional second pumping device and hose combination (and even third), working from the same hopper supply and air source. This option provides increased production for high volume output and/or a back-up if one of the pumping devices requires maintenance.

Figure 4:
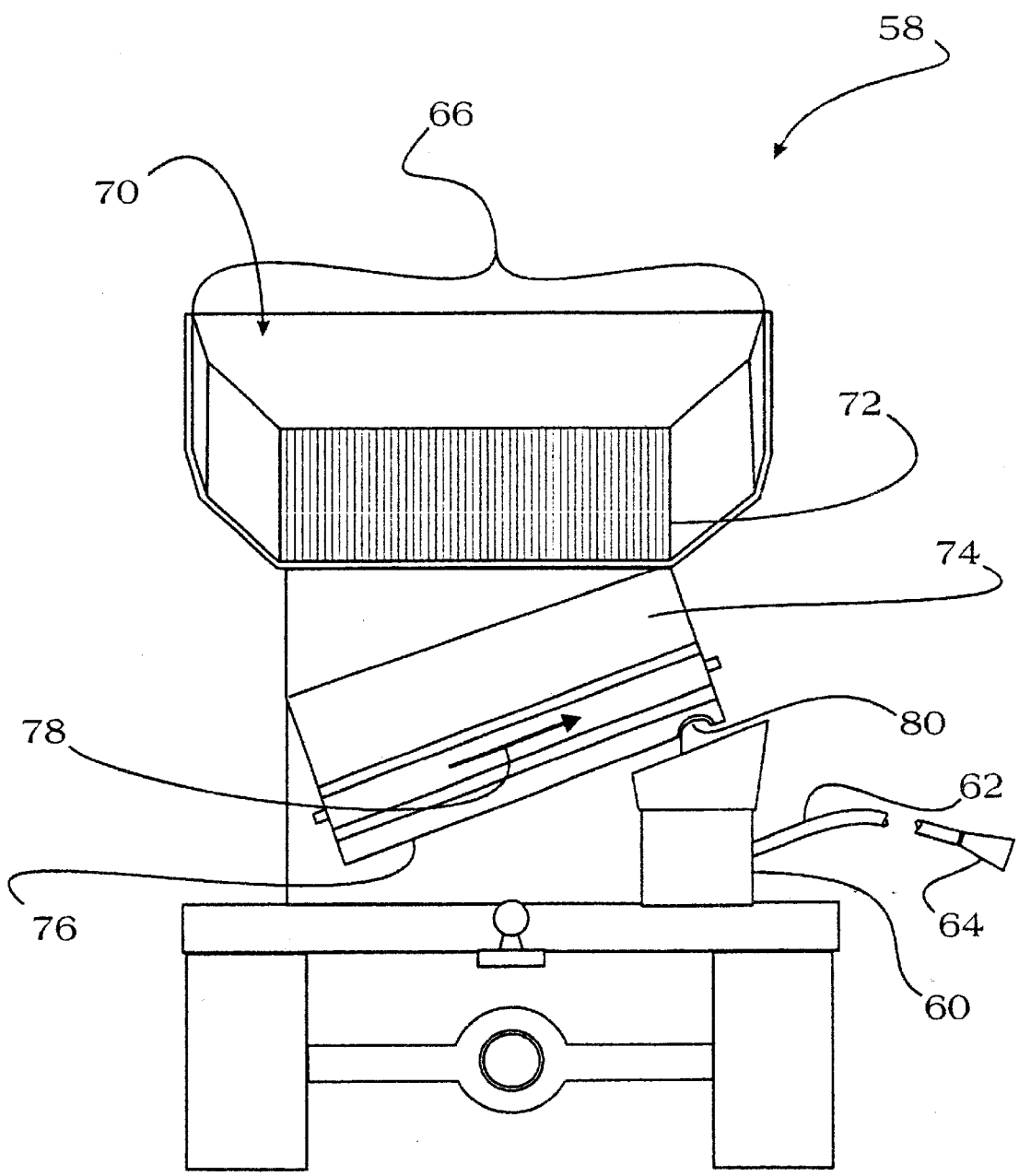
FIG. 4 is a back view of a preferred feeder/hopper means.

If we now turn to FIG. 4, we can examine another unique aspect of the present invention. FIG. 4 is a back view of a preferred feeder/hopper means 58. FIG. 4 depicts the feeder/hopper means 58, and as can be seen, the mouth 66 spans the entire opening in the chute 70 at the top of the feeder/hopper means 58. The mouth 66 is configured to be low enough to the ground so that the loader tractor can dump a load therein. Furthermore, there is a grating 72 to prevent foreign objects or people from falling into the hopper area 74.

One distinct problem with previous methods, and in particular with the transport of rock, has been the providing of a consistent non-fluctuating flow of gravel from the feed side to the pumping device 60. In the present invention, this is accomplished by providing a compactor drive apparatus 76. The compactor drive apparatus 76 is essentially a screw auger which is tilted at an angle, such that the natural inclination of the rock is to fall to the lower section of the compactor drive apparatus 76, after which the internal mechanisms force the rock up. in direction 78 until they finally reach the compactor discharge point 80, where the rock falls into the pumping device 60 for discharge through the hose 62 and nozzle 64. In this way then, any clumping or air space is removed from the granulate, including rock, gravel or sand, while the granulate is forced in direction 78 by the compactor drive apparatus 76. As a result, the pumping device 60 experiences a consistent non-fluctuating flow of granulate for pumping through the hose 62.

Another substantial benefit gained through use of the device and method of the present invention involves the backfilling of retaining walls, in areas inaccessible by tractors or wheelbarrows.

Figure 5A:
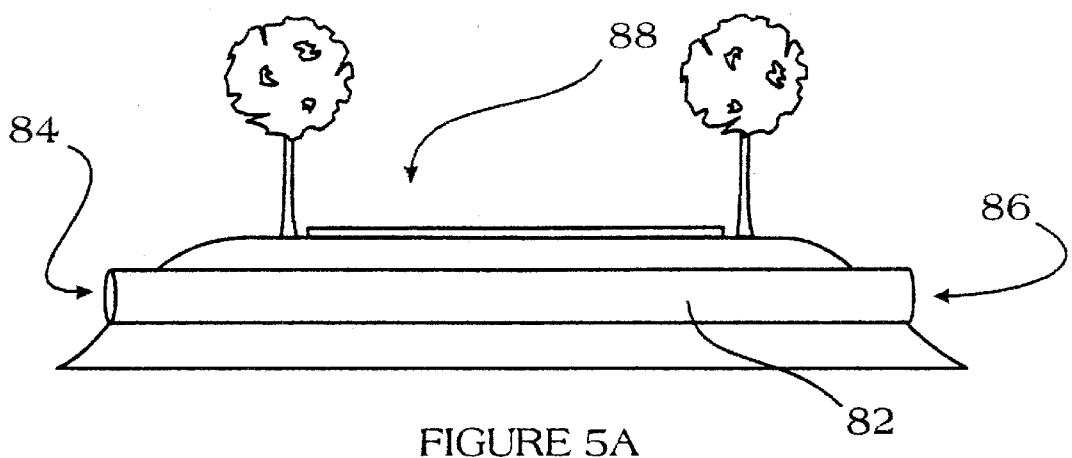
FIG. 5 is a side view of a prior art method for filling conduit.
Figure 5B:
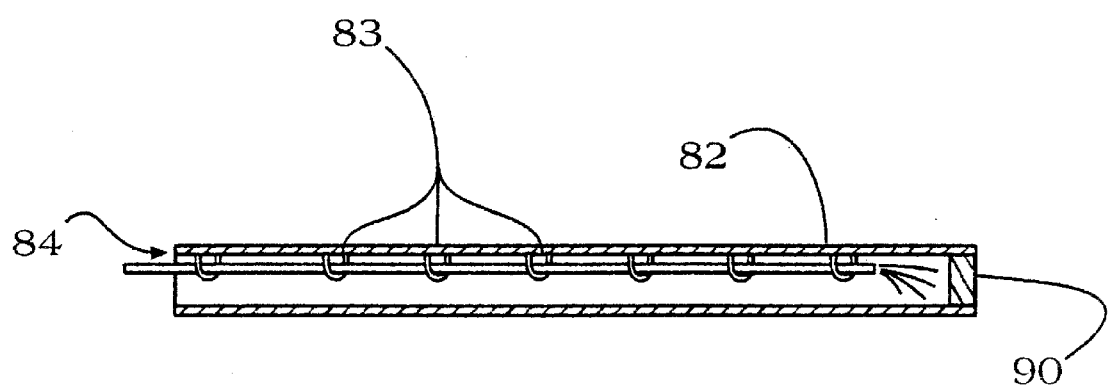
Figure 5B:
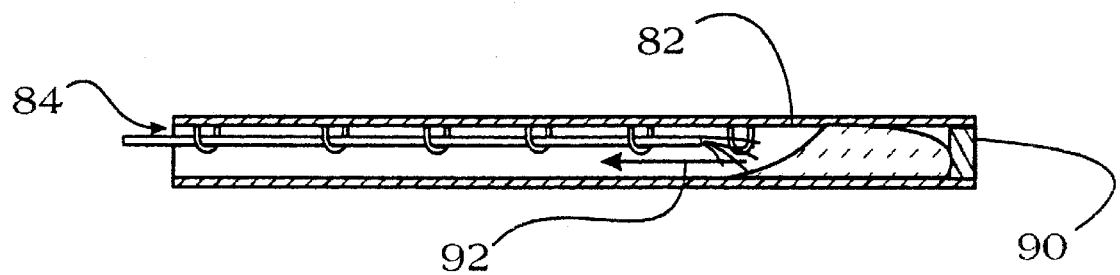

If we now turn to FIG. 5 we can discuss yet another advantage of the present invention. FIG. 5 depicts conventional means for filling a conduit 82. As can be seen in this simulation, the conduit 82 is a large diameter pipe, having a first opening 84 and a second opening 86 on either side of a thoroughfare 88, such as a road or freeway. It is through these conduits 82 that many services such as cables, or smaller supply pipes pass under the thoroughfare 88. For structural reasons, however, the conduit 82 cannot remain open, but must be filled with some sort of non-compacting material. This is typically accomplished by filling it with sand. As can be seen in FIG. 5B, the conventional method is to first install a cement plug 90, for example, to cover the second opening 86 in the conduit 82. A series of brackets 83 are then welded or otherwise attached in place inside of the conduit 82 in order to restrain the application pipe of a conventional sand blasting rig. What happens next is that the sandblasting rig is is activated and sand begins to fill in the direction 92 through the application pipe placed in the first opening 84. The problem is that as the sand fills in the direction 92, the pipe must be slid back and removed section by section. The application pipe is pulled back, the rig is shut down, a section of pipe is cut out and the supply hose is reconnected. This is done several times in the course of filling the conduit 82 until sand is filled as close as possible to the first opening 84.

Figure 6:
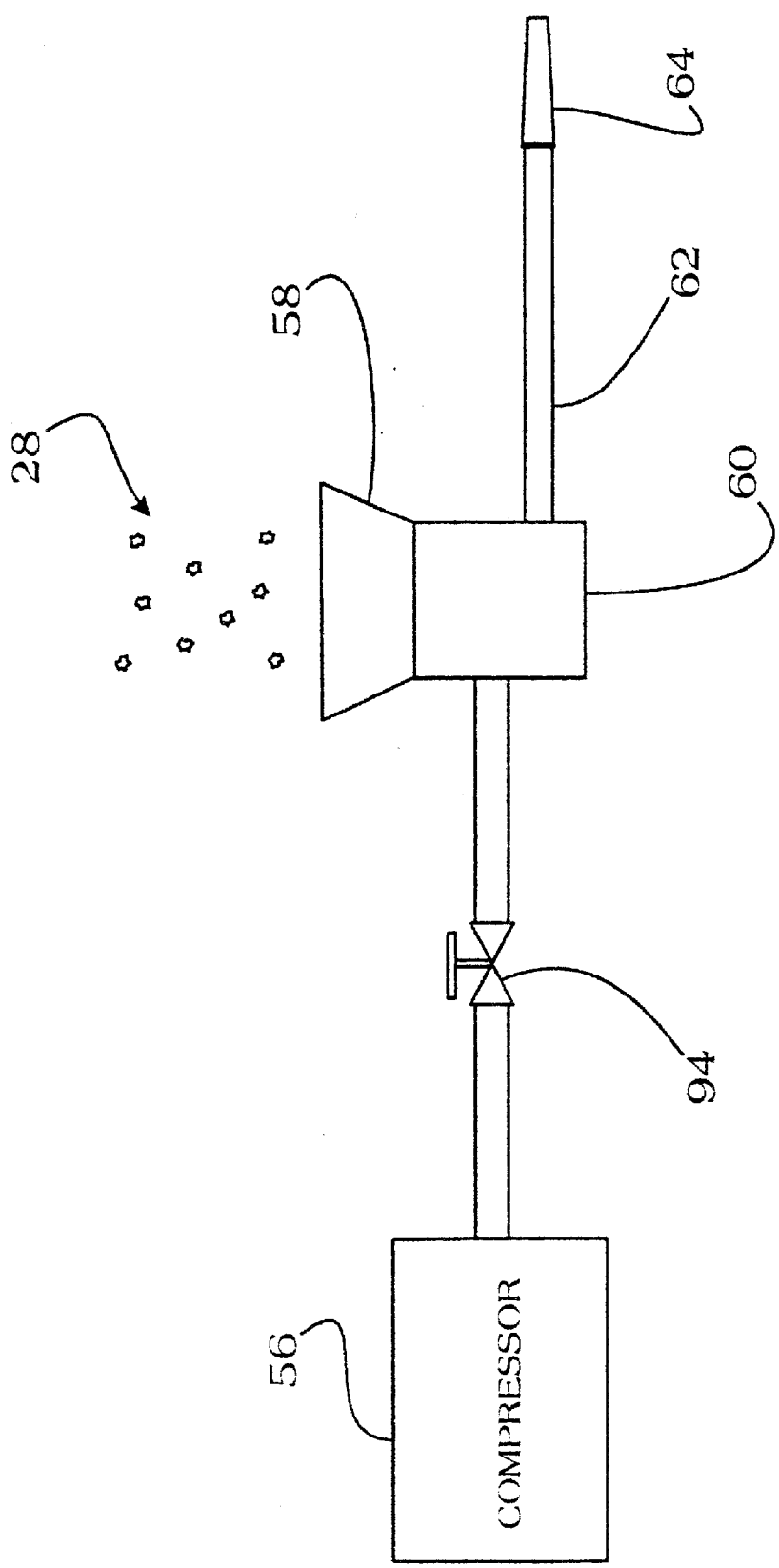
FIG. 6 is a block diagram of another preferred embodiment of the apparatus of the present invention.

If we now turn to FIG. 6, we can discuss how a novel aspect of the present invention provides a substantial benefit in the filling of conduit and other piping with sand. FIG. 6 is a block diagram of the pertinent portions of the apparatus of the present invention. As can be seen, the compressor 56 feeds the pumping device 60 with compressed air, while granulate material 28 is fed into the feeder hopper means 58 and discharged from the pumping device 60 through hose 62 and out through nozzle 64. What is unique is that the present invention includes a regulating means 94 for regulating the air pressure between the compressor 56 and the pumping device 60. The regulating means 94 provides the ability to regulate the compressor pressure 56 discharge all the way down to approximately 15 psi while still maintaining high volume of air. It should be appreciated that depending upon the type of granulate being pumped, the regulating means 94 might be adjusted to increase or decrease the discharge pressure of the compressor 56.

Figure 7A:
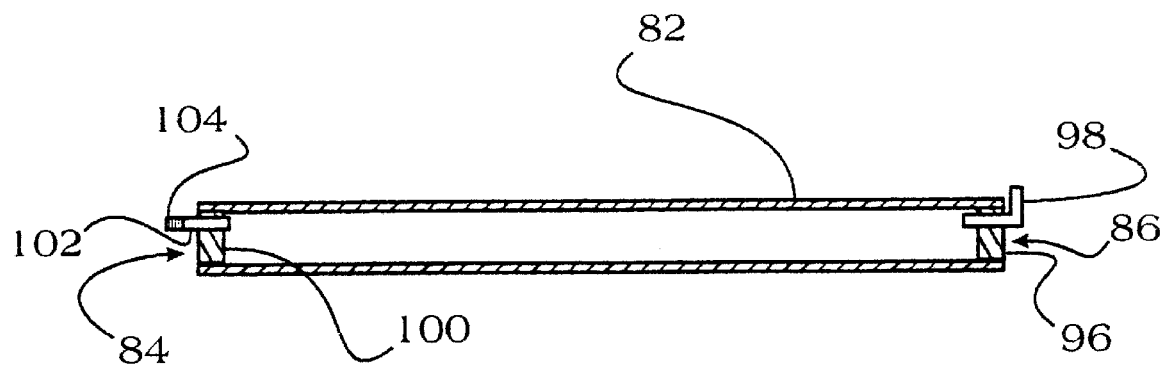
FIG. 7 is a series of side views of the improved method for filling conduit using the apparatus of the present invention.
Figure 7B:
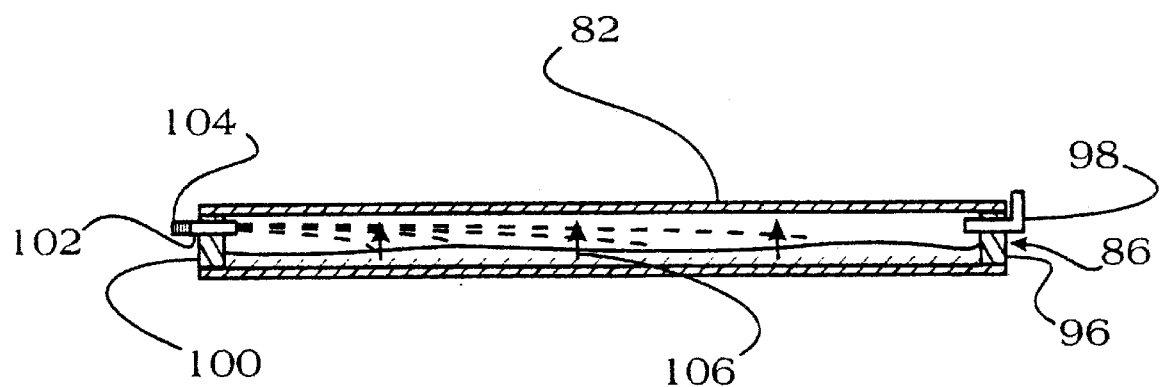

If we now turn to FIG. 7, we can examine how the aforementioned regulating means 94 can provide an improved process for filling conduit 82. FIG. 7 is a series of side views of the improved method for filling conduit using the apparatus of the present invention. As can be seen in FIG. 7A, step 1 includes installing a plug 96 to enclose the second opening 86. This new plug 96 includes a vent 98. Step 2 involves installing a second plug 100 to close the first opening 84. The second plug 100 includes and inlet tap 102. The inlet tap 102 includes the means for attaching 104 the hose 62 thereto. Once the first plug 96 and the second plug 100 are installed, and the hose 62 is attached to the attaching means 104, FIG. 7B depicts how the conduit is filled. The discharge pressure is reduced via the regulating means 94 to approximately 15 psig. Because the pressure is so low, essentially, air flows through the conduit 82 and out through the vent 98 while depositing sand in the bottom of the conduit 82. As a result, sand fills the conduit 82 in the direction 106 (bottom-to-top rather than end-to-end). When the conduit 82 is filled with sand, it is readily apparent, because sand will begin to be forced out through the vent 98. after which the vent 98 is simply capped off and thereafter the inlet tap 102 is also removed and capped off. In practice then, the improved system can fill a conduit 82 in a fraction of the time of the previously-described process, since no stopping and cutting is necessary and the labor and materials to install the pipe and pipe hangers is eliminated.

In examining each of the aforementioned embodiments of the present invention, it should be understood that the term "unitary vehicle" as used in connection with the present invention, refers to both a self-propelled vehicle as well as a towed vehicle (such as a trailer).

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A method for filling conduit piping with sand and other fine granulates, said conduit having at least a first and second end, each said end respectively defined by a first and second opening, comprising the steps of:

placing first and second plugs in said first and second openings to define an enclosure inside said conduit, said first plug further defined by an inlet tap; and transferring said fine granulate through said inlet tap in a fluid stream until said enclosure is substantially full.

2. The method of claim 1, wherein said placing step further comprises placing said second plug in said second opening, wherein said second plug is defined by a vent.

3. The method of claim 2, wherein said transferring step is ceased when said granulate begins to exit from said vent.

* * * * *